United States Patent
Poussin

(10) Patent No.: US 7,214,352 B2
(45) Date of Patent: May 8, 2007

(54) INCREASED CAPACITY REACTOR AND ITS USE

(75) Inventor: Bernard Poussin, Carrieres sur Seine (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 719 days.

(21) Appl. No.: 10/383,883

(22) Filed: Mar. 10, 2003

(65) Prior Publication Data

US 2003/0219365 A1     Nov. 27, 2003

(30) Foreign Application Priority Data

Mar. 8, 2002  (FR)  ................................. 02/02.984

(51) Int. Cl.
*B01J 8/02*       (2006.01)
*B01J 35/02*     (2006.01)

(52) U.S. Cl. .................... 422/218; 422/220; 422/222; 422/232

(58) Field of Classification Search .............. 422/218, 422/220, 222, 232
See application file for complete search history.

(56) References Cited

U.S. PATENT DOCUMENTS 4,374,095 A  *  2/1983  Legg et al. ................. 422/218

* cited by examiner

*Primary Examiner*—N. Bhat
(74) *Attorney, Agent, or Firm*—Millen, White, Zelano & Branigan, P.C.

(57) ABSTRACT

A cylindrical reactor containing a radial particle bed suitable for hydrocarbon reforming comprises: a reactor inlet (1) having a means of feeding a charge, numerous perforated, internal conduits (5) arranged around the periphery of the reactor and parallel to the axis of the reactor, which feed particle bed (2) with the charge, a circular collar (8) supporting the conduits in the lower bottom of the reactor, a perforated (7) central collector (3) receiving a reactor effluent connected to an outlet (14). Collar (8) is perforated with openings (9) plumb with each conduit (5) and it comprises a vertical, circular grate (11) that is perforated with holes (12) impervious to particles and is suspended on the collar so as to delimit, with the wall of the reactor, a ring-shaped chamber (10) for circulation of the charge, the height of the grate being adjusted so that it delimits an internal passage between the grate and the bottom of the reactor, which is made impervious to particles by a fabric whose upper part is attached to the grate and whose lower part rests on the bottom of the reactor.

22 Claims, 1 Drawing Sheet

INCREASED CAPACITY REACTOR AND ITS USE

The invention relates to a cylindrical reactor containing a radial bed with particles of a solid, in particular catalytic particles, with substantially improved capacity.

It also relates to the use of this reactor in a hydrocarbon conversion process using a radial bed and in particular in a process of catalytic reforming of hydrocarbons.

A reactor with a radial bed of a cylindrical shape is equipped with perforated conduits approximately parallel to the axis of the reactor or to the generatrices of the cylindrical reactor, called "scallops" in English. The conduits conduct the gas vertically along the wall of the reactor and make possible a radial diffusion of the gas when it passes through the catalyst bed toward a central collector that recovers a reaction effluent.

At the bottom of the reactor, the conduits are supported and attached to a solid circular collar, which has the effect of limiting the diffusion of the gas. Further, the radial bed reactor is closed at its lower part by an elliptical or hemispheric bottom filled with inert globules, and thus all this occupied volume is inactive. Finally, the central collector that recovers the gas after it passes through the catalytic bed is perforated to 200 mm, for example above the tangent line, i.e., above the connection of the bottom with the shell, to prevent a tendency of the gas to flow between the conduits and the central collector.

These zones that have little gas flowing through them and that are not filled with catalyst thus reduce the active volume of the reactor and thus its capacity, its activity and its lifetime.

The object of the invention is to solve the drawbacks mentioned. Another object of the invention is to increase the catalyst mass able to be introduced into a reactor volume and to make it as active as possible, notably in the bottom zone.

Another object is to increase the lifetime of the units.

BRIEF DESCRIPTION OF THE DRAWINGS

The attached drawing is a preferred embodiment of a partial schematic of a part of the lower end of a reactor according to the invention.

More particularly, the invention relates to a reactor that is cylindrical at the bottom and with a curved shape containing a radial bed of particles of a solid and comprising:

Figure 1:
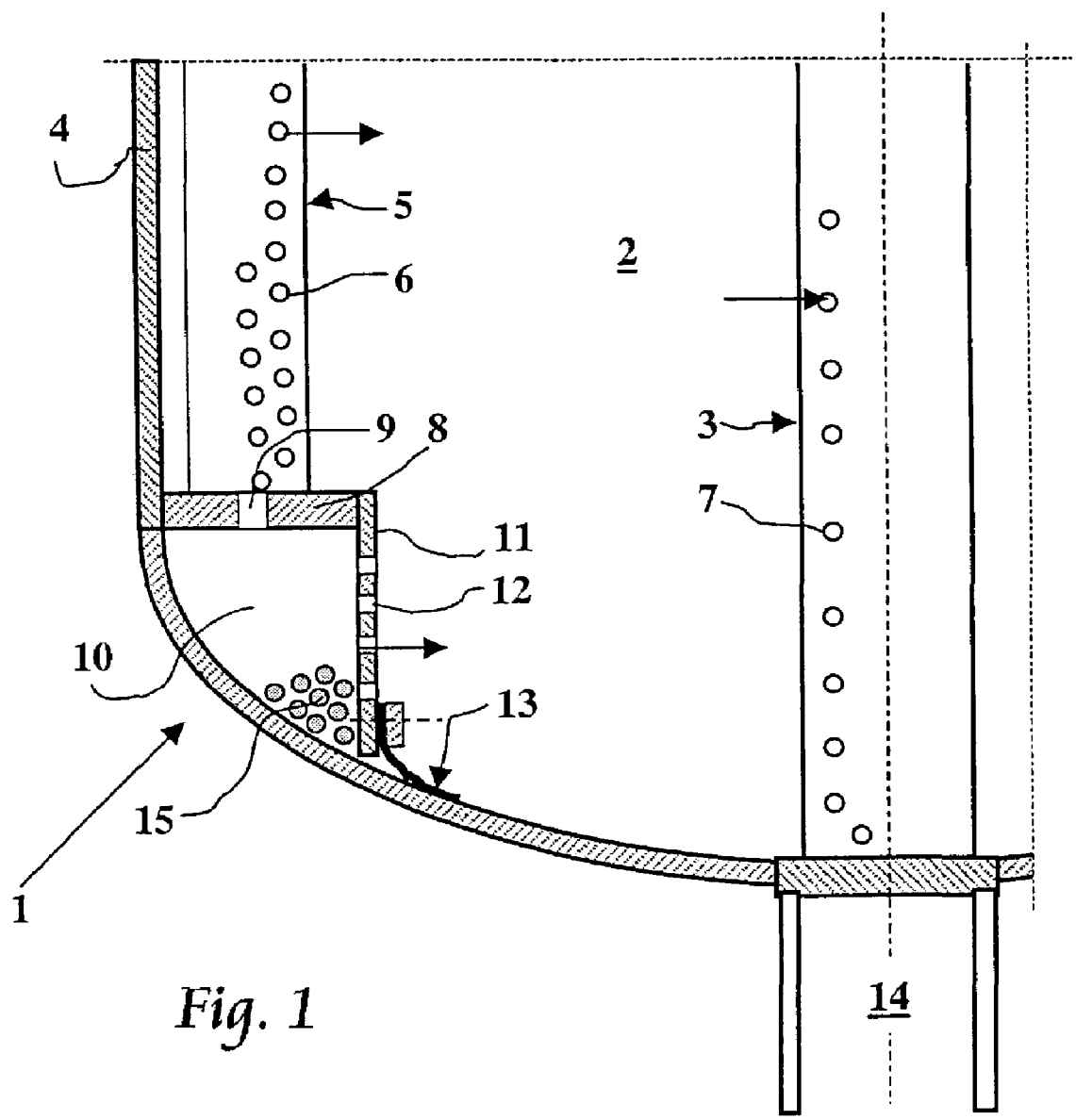

a reactor inlet (1) having a means of feeding a reactor charge, numerous perforated, internal conduits (5), placed at the periphery of the reactor and approximately parallel to the axis of the reactor, connected to the feed means, the conduits feeding radial particle bed (2) with the charge, a circular collar (8) supporting the conduits in the lower bottom of the reactor, a perforated (7), central collector (3) elongated along said axis that receives a reactor effluent resulting from contact of the charge with the particle bed, the particle bed located between the lateral conduits and the collector, and an outlet (14) connected to the central collector.

The reactor is characterized in that collar (8) is pierced with at least one opening (9) plumb with each conduit (5) and in that it comprises a circular, vertical grate (11) pierced with holes (12) that are essentially impervious to particles, suspended from said collar so as to delimit, with the wall of the reactor, a ring-shaped chamber (10) for circulation of the charge, the height of the grate being adjusted so that it delimits an internal passage between the grate and the bottom of the reactor, said passage being made essentially impervious to particles by sealing means (13) consisting of a fabric whose upper part is attached to the grate and whose lower part rests on the bottom of the reactor.

In was noted that under these conditions, the supplemental volume of particles introduced could represent up to 8 to 15% of the volume already introduced.

Moreover, the central collector could be perforated over essentially all its available surface.

The supplemental volume of particles is flooded by the gas passing through the perforated, circular grate and the effluent produced can be evacuated by the central collector whose perforation surface has been substantially increased.

The circular grate cannot be welded to the bottom of the reactor because of problems connected with the differential expansion of the metals used and the difficulty in achieving impermeability at the intersection of the grate and the bottom of the reactor.

To solve this difficulty, the grate's imperviousness to particles where it makes contact with the bottom of the reactor is provided by a fabric that can be refractory or metallic and supple and is attached to the grate.

Preferably, the metallic fabric made of stainless steel can be of a mesh size between 0.05 and 0.8 times the size of the particles.

According to an advantageous characteristic of the invention, the vertical, circular grate can be located approximately perpendicular to the lateral conduits, i.e., perpendicular to the interface with the particle bed. Its function, like the fabric to which it is attached, is to let pass the gaseous reactor charge that is to pass through the particle bed, while being perfectly impervious to particles.

A Johnson grate, for example, can be used, which is well suited for this double function.

According to another characteristic of the reactor, the collar can be perforated with an opening whose cross section is between 0.2 and 1 time the section of the lateral conduit. The collar can advantageously be perforated with several openings plumb with each lateral conduit, whose total cross section is between 0.2 and 1 time the section of the lateral conduit feeding the radial particle bed.

The fabrics used according to the invention consist of fibers that are generally made of refractory ceramic material. They generally have a porosity such that the available interstice does not exceed 1 mm.

They are supple and resistant to deformations and they can withstand temperatures higher than 1,200° C.

They can be combined with other metallic oxides (alkalines, alkaline earths, iron, titanium, boron, for example), increasing their mechanical strength and/or their impermeability. For example, the textile ZETEX (registered trademark) is used, whose fiber composition is advantageously the following:

| | |
|---|---|
| silicon oxide | 52–60% |
| calcium oxide | 16–25% |
| aluminum oxide | 10–13% |
| boron oxide | 8–13% |
| sodium oxide | 0–1% |
| magnesium oxide | 0–6% | and whose tensile strength is, for example, about 17,400 kg/cm$^2$ at 540° C.

A knitted fabric based on refractory stainless steel filaments can be used, for example, 304 L or 316 L from the GANTOIS Company, St. Die, France.

This fabric has an aperture size of 1 mm and a filament diameter of 0.125 mm.

"KATISS" fabric can also be used, consisting of a KERLANE 45 ceramic fiber nap, able to withstand up to more than 1,260° C., reinforced on its two faces by an E glass fabric (silica). It usually has the following composition:

| | |
|---|---|
| Al2O3 | 47% |
| SiO2 | 52% |
| Fe2O3 + TiO2 ≦ 0.20% | |
| CaO + MgO | ≦0.15% |
| Na2O + K2O | ≦0.25% |

Fabric consisting of CERAFIBER refractory fibers reinforced by Inconel wires able to withstand up to 1,260° C. in a normal oxidizing atmosphere can also be used. It consists of:

| | |
|---|---|
| Al2O3 | 46.5% |
| SiO2 | 53% |
| Fe2O3 | 0.1% |
| TiO2 | 0.05% |
| MgO | 0.01% |
| CaO | 0.04% |
| Na2 + K2O | 0.2% |

Excellent results were obtained with HEXCEL GENIN 1003 fabrics and especially with HEXCEL GENIN 1217 fabrics from the company HEXCEL GENIN in Decines-Charpieu in France.

The composition of these fabrics is presented in the following table:

| | Hexcel Genin 1003 | Hexcel Genin 1217 |
|---|---|---|
| SiO2 | 83.98 | 24.17 |
| Al2O3 | 0.66 | 62.37 |
| B2O3 | 0.20 | 15.62 |
| CaO | 0.42 | <0.05 |
| MgO | <0.05 | <0.05 |
| TiO2 | 0.35 | <0.05 |
| Na2O | <0.05 | <0.05 |
| C | <0.2 | <0.2 |

Fabric of the NEXTEL (registered trademark of the Societe 3M France) ceramic fiber can also be used, which has the following characteristics:

| | NEXTEL 312 | NEXTEL 440 |
|---|---|---|
| Composition | 62% Al2 | 70% Al2O3 |
| | 24% SiO2 | 28% SiO2 |
| | 14% B2O3 | 2% B2O3 |
| Mechanical properties | | |
| Rupture strength | 1725 Mpa | 2070 MpA |
| Thermal properties | | |
| Temp. in continuous use | 1200° C. | 1370° C. |

Felts can also be used. By way of illustration of a metallic felt, BEKAERT 316L made of stainless steel can be mentioned.

In a large diameter reactor, the fabric can be cut to the appropriate height, its lower part resting largely on the lower bottom of the reactor.

In a smaller diameter reactor, fabrics in the shape of ring-shaped sections can be cut and their edges sewn by a heat resistant filament. More simply, the fabric can be cut in part perpendicular to its largest dimension and the edges can be superposed. The fabric can also be allowed to be folded. In all cases, the impermeability is assured by the weight of the particles that hold the fabric against the lower bottom of the reactor.

The invention will be better understood with reference to the single drawing representing the lower end of a radial bed filled with particles of solid.

A reactor (1) of elongated shape contains a catalytic bed (2) placed between a central flue (3) and shell (4) of this reactor. Through the top of the reactor, not represented in the drawing, a gaseous petroleum charge is introduced and is guided by numerous internal conduits (5), called "scallops," at the periphery of the reactor and approximately parallel to the axis of the reactor. These conduits are attached to the shell and are perforated by numerous openings (6) in contact with the catalytic bed, making it possible to diffuse the gas radially toward a central flue (3), itself perforated up to its lower end with openings (7) suited for collecting the reactor effluent.

Further, conduits (5) are supported, at the lower bottom of the reactor, by a circular collar (8) welded to the shell and approximately perpendicular to the wall of the reactor, and perforated with at least one opening (9) plumb with each conduit, which makes it possible for part of the charge to pass through a ring-shaped chamber (10) located under the collar. This chamber is delimited in its upper part by the collar, by a part of the lower bottom of the reactor and by a circular grate (11) perforated with holes (12), JOHNSON type grate, approximately vertical and suspended from the collar, approximately perpendicular to the conduits, i.e., perpendicular to the interface with the bed. The charge thus circulates in the conduits, feeding the reactor and in the chamber via openings (9). The chamber feeds the lower bottom of the reactor via grate (11).

This grate (11) can be plumb with lateral conduit (5) or perceptibly shifted toward central flue (3) and advantageously located at a distance from the flue between e and 0.8 e, e being the thickness of the radial bed at the level of the conduits.

The height of the grate is such that it does not reach the bottom of the reactor. The space or passage thus created is made essentially impervious to particles from the bed due to the attachment to the grate, by bolting, for example, of a refractory fabric 13 labeled NEXTEL® (3M) whose fiber composition is the following:

| | NEXTEL 312 | NEXTEL 440 |
|---|---|---|
| Composition | 62% Al2 | 70% Al2O3 |
| | 24% SiO2 | 28% SiO2 |
| | 14% B2O3 | 2% B2O3 |
| Mechanical properties | | |
| Rupture strength | 1725 Mpa | 2070 MpA |
| Thermal properties | | |
| Temp. in continuous use | 1200° C. | 1370° C. |

The lower part of the fabric rests on the bottom of the reactor and stays there pressed by the weight of the catalytic particles.

The diameter or the smallest dimension of openings (6) on conduits (5) or of openings (12) on grate (11) is adjusted so that the particles cannot penetrate into the conduits or into ring-shaped chamber (10). On the other hand, these openings as well as the fabric are permeable to gases and allow the latter to pass through the catalyst bed in an approximately radial manner up to openings (7) of flue (3). Openings (6) and (12) typically have the dimensions of slits of 0.8×20 mm for the perforated plates and for the "JOHNSON" grates, slit widths of 1 mm.

A reaction effluent is recovered by the flue and withdrawn by a lower hole 14 connected to the latter.

Inert, refractory globules (15) can be introduced into the lower part of ring-shaped chamber (10) optionally to prevent accidental ascent of particles.

The preceding examples can be repeated with similar success by substituting the generically or specifically described reactants and/or operating conditions of this invention for those used in the preceding examples.

The entire disclosure[s] of all applications, patents and publications, cited herein and of corresponding French application No. 02/02.984, filed Mar. 8, 2002 is incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A cylindrical reactor with a curved shape bottom, containing a radial bed of particles of a solid and comprising:
   a reactor (1) having a means of feeding a charge,
   a plurality of perforated, internal conduits (5), placed at the periphery of the reactor and approximately parallel to the axis of the reactor, said conduits being connected to the feed means, whereby said conduits feed said radial particle bed (2) with said reactor charge,
   a circular collar (8) supporting the perforated internal conduits, said circular collar (8) being located in the lower bottom of the reactor,
   a perforated (7), central collector (3) elongated along said axis that receives an effluent resulting from contact of the charge with the particle bed,
   an outlet (14) connected to the central collector,
   wherein the particle bed is located between the conduits and the collector, and
   wherein said collar (8) is pierced with at least one opening (9), plumb with each conduit (5), and
   said reactor further comprises a circular, vertical grate (11) pierced with holes (12) that are essentially impervious to particles, suspended from said circular collar so as to delimit, with the wall of the reactor, a ring-shaped chamber (10), spaced away from said perforated central collector for circulation of the charge, the height of the grate being adjusted so that it delimits an internal passage between the grate and the bottom of the reactor, said passage being made essentially impervious to particles by sealing means (13) comprising a gas-pervious fabric whose upper part is attached to the grate and whose lower part rests on the bottom of the reactor.

2. A reactor according to claim 1, wherein the fabric is a refractory fabric.

3. A reactor according to claim 1, wherein the fabric is supple metallic fabric.

4. A reactor according to claim 2, wherein the refractory fabric has a mesh between 0.05 and 0.8 times the size of the particles.

5. A reactor according to claim 1, wherein the vertical, circular grate is located approximately perpendicular to the lateral conduits.

6. A reactor according to claim 1, wherein the collar is perforated with an opening whose cross section is between 0.2 and 1 times the cross section of the lateral conduit.

7. A reactor according to claim 1, wherein the collar is perforated with several openings plumb with each lateral conduit whose total cross section is between 0.2 and 1 times the section of the lateral conduit.

8. A reactor according to claim 1, wherein the vertical grate is a JOHNSON grate.

9. A reactor according to claim 1, wherein the fabric is a NEXTEL® fabric.

10. In a process of catalytically reforming hydrocarbons, comprising introducing hydrocarbons to be reformed into a reactor, the improvement wherein said reactor is a reactor according to claim 1.

11. A reactor according to claim 3, wherein the metallic fabric has a mesh between 0.05 and 0.8 times the size of the particles.

12. A reactor according to claim 2, wherein the vertical, circular grate is located approximately perpendicular to the lateral conduits.

13. A reactor according to claim 3, wherein the vertical, circular grate is located approximately perpendicular to the lateral conduits.

14. A reactor according to claim 4, wherein the vertical, circular grate is located approximately perpendicular to the lateral conduits.

15. A reactor according to claim 11, wherein the vertical, circular grate is located approximately perpendicular to the lateral conduits.

16. A reactor according to claim 2, wherein the collar is perforated with an opening whose cross section is between 0.2 and 1 times the cross section of the lateral conduit.

17. A reactor according to claim 3, wherein the collar is perforated with an opening whose cross section is between 0.2 and 1 times the cross section of the lateral conduit.

18. A reactor according to claim 4, wherein the collar is perforated with an opening whose cross section is between 0.2 and 1 times the cross section of the lateral conduit.

19. A reactor according to claim 5, wherein the collar is perforated with an opening whose cross section is between 0.2 and 1 times the cross section of the lateral conduit.

20. A reactor according to claim 11, wherein the collar is perforated with an opening whose cross section is between 0.2 and 1 times the cross section of the lateral conduit.

21. A reactor according to claim 1, wherein said chamber (10) is delimited in part by a part of the curved shape reactor bottom, and the grate is in contact with the particle bed.

22. A reactor according to claim 21, wherein said perforated central collector extends at least sufficiently downward to the curved shape bottom so that said perforated central collector is at least vertically coextensive with said vertical grate.

* * * * *